(12) United States Patent
Xu

(10) Patent No.: US 10,880,905 B2
(45) Date of Patent: Dec. 29, 2020

(54) METHODS AND APPARATUSES FOR CONTROL RESOURCE BUNDLING AND MAPPING IN WIRELESS COMMUNICATION SYSTEMS

(71) Applicant: GUANGDONG OPPO MOBILE TELECOMMUNICATIONS CORP., LTD., Guangdong (CN)

(72) Inventor: Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/668,788

(22) Filed: Oct. 30, 2019

(65) Prior Publication Data

US 2020/0068591 A1 Feb. 27, 2020

Related U.S. Application Data

(63) Continuation of application No. PCT/CN2018/083050, filed on Apr. 13, 2018.

(60) Provisional application No. 62/500,156, filed on May 2, 2017.

(51) Int. Cl.
*H04W 72/12* (2009.01)
(52) U.S. Cl.
CPC .............................. *H04W 72/1205* (2013.01)
(58) Field of Classification Search
None
See application file for complete search history.

(56) References Cited

U.S. PATENT DOCUMENTS

| 2013/0083740 | A1 | 4/2013 | Eriksson |
| 2016/0142902 | A1 | 5/2016 | Ramamurthi |
| 2016/0192391 | A1* | 6/2016 | Larsson ............... H04L 1/1893 370/280 |
| 2017/0034850 | A1 | 2/2017 | Rico Alvarino et al. |
| 2018/0227156 | A1* | 8/2018 | Papasakellariou .. H04W 74/006 |
| 2018/0359755 | A1* | 12/2018 | Sun .................... H04W 72/0453 |
| 2019/0037540 | A1* | 1/2019 | Seo ...................... H04W 72/042 |
| 2019/0069276 | A1* | 2/2019 | Kwak .................... H04L 1/0071 |
| 2019/0140776 | A1* | 5/2019 | Seo ........................ H04L 5/0048 |
| 2019/0230685 | A1* | 7/2019 | Park ...................... H04W 72/12 |
| 2019/0357188 | A1 | 11/2019 | Kwak et al. |
| 2019/0387514 | A1* | 12/2019 | Horiuchi ................ H04L 27/26 |

(Continued)

FOREIGN PATENT DOCUMENTS

| CN | 102082600 A | 6/2011 |
| CN | 104982084 A | 10/2015 |

(Continued)

OTHER PUBLICATIONS

International Search Report in the international application No. PCT/CN2018/083050, dated Jul. 4, 2018.

(Continued)

*Primary Examiner* — Otis L Thompson, Jr.

(57) ABSTRACT

Methods and apparatuses for controlling resource bundling in a wireless communication system, the method including selecting a bundle size; bundling, according to the bundle size, resource element groups (REGs) of a first control channel element (CCE) into one or more first REG bundles; and mapping the one or more first REG bundles to physical resource elements for control channel transmission.

20 Claims, 9 Drawing Sheets

(56) References Cited

U.S. PATENT DOCUMENTS

| | | | |
|---|---|---|---|
| 2020/0021419 A1* | 1/2020 | Taherzadeh Boroujeni | ................. H04L 5/0091 |
| 2020/0028646 A1* | 1/2020 | Seo | ................. H04L 5/0048 |
| 2020/0036497 A1* | 1/2020 | Xu | ................. H04W 72/0453 |

FOREIGN PATENT DOCUMENTS

| | | |
|---|---|---|
| EP | 3480994 A1 | 5/2019 |
| WO | 2016076988 A1 | 5/2016 |
| WO | 2017019587 A2 | 2/2017 |

OTHER PUBLICATIONS

Written Opinion of the International Search Authority in the international application No. PCT/CN2018/083050, dated Jul. 4, 2018.
Qualcomm Incorporated. "Tx diversity scheme for DL control channel", R1-1705601, 3GPP TSG-RAN WG1 #88bis, Apr. 7, 2017 (Apr. 7, 2017); sections 1-2.
Qualcomm Incorporated. "Wideband RS and narrowband RS", R1-1706203, 3GPP TSG RAN WG1 Meeting #88bis, Apr. 7, 2017 (Apr. 7, 2017); sections 1-2.
Qualcomm Incorporated. "Tx diversity scheme for PDCCH", R1-1702624, 3GPP TSG-RAN WG1 #88, Feb. 17, 2017 (Feb. 17, 2017); sections 1-2.
Panasonic: "The relation among RS, REG, CCE, and CORSET", 3GPP Draft; R1-1705173, 3rd Generation Partnership Project (3GPP) vol. RAN WG1, No. Spokane, USA; Apr. 3-7, 2017 Apr. 2, 2017 (Apr. 2, 2017), XP051243304, Retrieved from the Internet: URL: http://www.3gpp.org/ftp/Meetings_3GPP _SYNC/RAN1/Docs/ [retrieved on Apr. 2, 2017] Section 2.
Supplementary European Search Report in the European application No. 18794610.8, dated Mar. 9, 2020.
Samsung "NR-PDCCH Tx Diversity Scheme" 3GPP TSG RAN WG1 Meeting #86bis R1-1705374 Spokane, USA, Apr. 3-7, 2017.
First Office Action of the Chilean application No. 201903128, dated Oct. 20, 2020.
First Office Action of the Chinese application No. 201911295787.8, dated Nov. 3, 2020.

* cited by examiner

METHODS AND APPARATUSES FOR CONTROL RESOURCE BUNDLING AND MAPPING IN WIRELESS COMMUNICATION SYSTEMS

CROSS REFERENCE TO RELATED APPLICATION

The present application claims the benefit of priority to U.S. Provisional Application No. 62/500,156, filed on May 2, 2017, the entire contents of which are incorporated herein by reference.

TECHNICAL FIELD

The present application relates to communication systems, and more particularly, to methods and apparatuses for control resource bundling and mapping in wireless communication systems.

BACKGROUND

In a long term evolution (LTE) system, a control region spanning over several orthogonal frequency-division multiplexing (OFDM) symbols and several frequency subcarriers may be allocated for transmission of a physical downlink control channel (PDCCH). A resource element is defined as the smallest resource structure, covering one subcarrier over one OFDM symbol. Multiple resource elements form a resource element group (REG). A PDCCH is carried by one or multiple control channel elements (CCE), each consisting of a number of REGs, depending on the size of payload and channel quality. The REGs of different PDCCHs may be interleaved and spread across the whole control region to achieve time and frequency gain. Because a user equipment (UE) may not know which REGs carry PDCCH information intended for it, the UE may need to blindly decode possible REGs to receive the UE's PDCCH before receiving the UE's user data in the same subframe. Blind decoding is complicated and requires a large amount of calculation.

In a new radio system, such as the fifth generation (5G) new radio system, a similar channel structure may be used for PDCCH. A new radio system may be deployed at a higher frequency (e.g., above 6 GHz), at which wide bandwidths are available. Some new techniques, such as beamforming (BF), could be adopted in the new radio system. A PDCCH in a new radio system may likewise include CCEs, each CCE including a set of REGs. But mapping a CCE or REG to the control region of time and frequency for PDCCH may be challenging. For example, demodulation reference signals (DMRS) may need to be used for PDCCH modulation. The DMRS may need to be transmitted with the PDCCH, but not across the whole control region, in a wide bandwidth. These new techniques require flexible PDCCH resource allocation and mapping between CCEs, REGs, and PDCCH to benefit from various gains, such as time and frequency diversity gain, localized frequency selective gain and BF gain.

SUMMARY

In some aspects, the present application is directed to a method for control resource bundling in a wireless communication system. The method includes selecting a bundle size. The method also includes bundling, according to the bundle size, resource element groups (REGs) of a first control channel element (CCE) into one or more first REG bundles. The method further includes mapping the one or more first REG bundles to physical resource elements for control channel transmission.

In some aspects, the present application is directed to a method for control resource bundling in a wireless communication system. The method includes transmitting a configuration of a control resource set. The configuration of the control resource set defines a plurality of parameters including one or more of: a beam number, a starting symbol number of the control resource set, a number of symbols of the control resource set, a size of a CCE, a number of CCEs, a size of a REG bundle, or a combination of a symbol number and a REG number for a REG bundle. The method also includes transmitting a control channel in a control region of physical resource elements according to the configuration of the control resource set.

In some aspects, the present application is also directed to a method for a wireless communication device. The method includes obtaining a bundle size. The method also includes detecting a control channel in a control resource set. The control resource set includes a first CCE. REGs of the first CCE are bundled, according to the bundle size, into one or more first REG bundles. The one or more first REG bundles are mapped to physical resource elements for control channel transmission. The method further includes decoding the control channel on the detected first CCE.

In some aspects, the present application is also directed to a method for detecting a control channel in a wireless communication system. The method includes receiving a configuration of a control resource set. The configuration of the control resource set defines a plurality of parameters including one or more of: a beam number, a starting symbol number of the control resource set, a number of symbols of the control resource set, a size of a CCE, a number of CCEs, a size of a REG bundle, or a combination of a symbol number and a REG number for a REG bundle. The method also includes detecting the control channel in a control region of physical resource elements according to the configuration of the control resource set.

In some aspects, the present application is also directed to a network apparatus for control resource bundling in a wireless communication system. The network apparatus includes a memory storing instructions. The network apparatus also includes a processor communicatively coupled to the memory. The instructions, when executed by the processor, cause the processor to perform operations including selecting a bundle size. The instructions, when executed by the processor, also cause the processor to perform the operations including bundling, according to the bundle size, REGs of a first CCE into one or more first REG bundles. The instructions, when executed by the processor, further cause the processor to perform the operations including mapping the one or more first REG bundles to physical resource elements for control channel transmission.

In some aspects, the present application is also directed to a network apparatus for control resource bundling in a wireless communication system. The network apparatus includes a memory storing instructions. The network apparatus also includes a processor communicatively coupled to the memory. The instructions, when executed by the processor, cause the processor to perform operations including transmitting a configuration of a control resource set. The configuration of the control resource set defines a plurality of parameters including one or more of: a beam number, a starting symbol number of the control resource set, a number of symbols of the control resource set, a size of a CCE, a number of CCEs, a size of a REG bundle, or a combination of a symbol number and a REG number for a REG bundle. The instructions, when executed by the processor, also cause the processor to perform operations including transmitting a control channel in a control region of physical resource elements according to the configuration of the control resource set.

In some aspects, the present application is also directed to a user device. The user device includes a memory storing instructions. The user device also includes a processor communicatively coupled to the memory. The instructions, when executed by the processor, cause the processor to perform operations including obtaining a bundle size. The instructions, when executed by the processor, also cause the processor to perform operations including detecting a control channel in a control resource set. The control resource set includes a first CCE. REGs of the first CCE are bundled, according to the bundle size, into one or more first REG bundles. The one or more first REG bundles are mapped to physical resource elements for control channel transmission. The instructions, when executed by the processor, cause the processor to perform operations including decoding the control channel on the detected first CCE.

In some aspects, the present application is also directed to a user device. The user device includes a memory storing instructions. The user device also includes a processor communicatively coupled to the memory. The instructions, when executed by the processor, cause the processor to perform operations including receiving a configuration of a control resource set. The configuration of the control resource set defines a plurality of parameters including one or more of: a beam number, a starting symbol number of the control resource set, a number of symbols of the control resource set, a size of a control channel element (CCE), a number of CCEs, a size of a resource element group (REG) bundle, or a combination of a symbol number and a PRB number for a REG bundle. The instructions, when executed by the processor, also cause the processor to perform the operations including detecting the control channel in a control region of physical resource elements according to the configuration of the control resource set.

In some aspects, the present application is also directed to a non-transitory computer-readable medium storing instructions that are executable by one or more processors of an apparatus to perform a method for control resource bundling in a wireless communication system. The method includes selecting a bundle size. The method also includes bundling, according to the bundle size, resource element groups (REGs) of a first control channel element (CCE) into one or more first REG bundles. The method further includes mapping the one or more first REG bundles to physical resource elements for control channel transmission.

In some aspects, the present application is also directed to a non-transitory computer-readable medium storing instructions that are executable by one or more processors of an apparatus to perform a method for receiving a control channel in a wireless communication system. The method includes obtaining a bundle size. The method also includes detecting a control channel in a control resource set. The control resource set includes a first CCE. REGs of the first CCE are bundled, according to the bundle size, into one or more first REG bundles. The one or more first REG bundles are mapped to physical resource elements for control channel transmission. The method further includes decoding the control channel on the detected first CCE.

It is to be understood that the foregoing general description and the following detailed description are exemplary and explanatory only, and are not restrictive of the invention, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
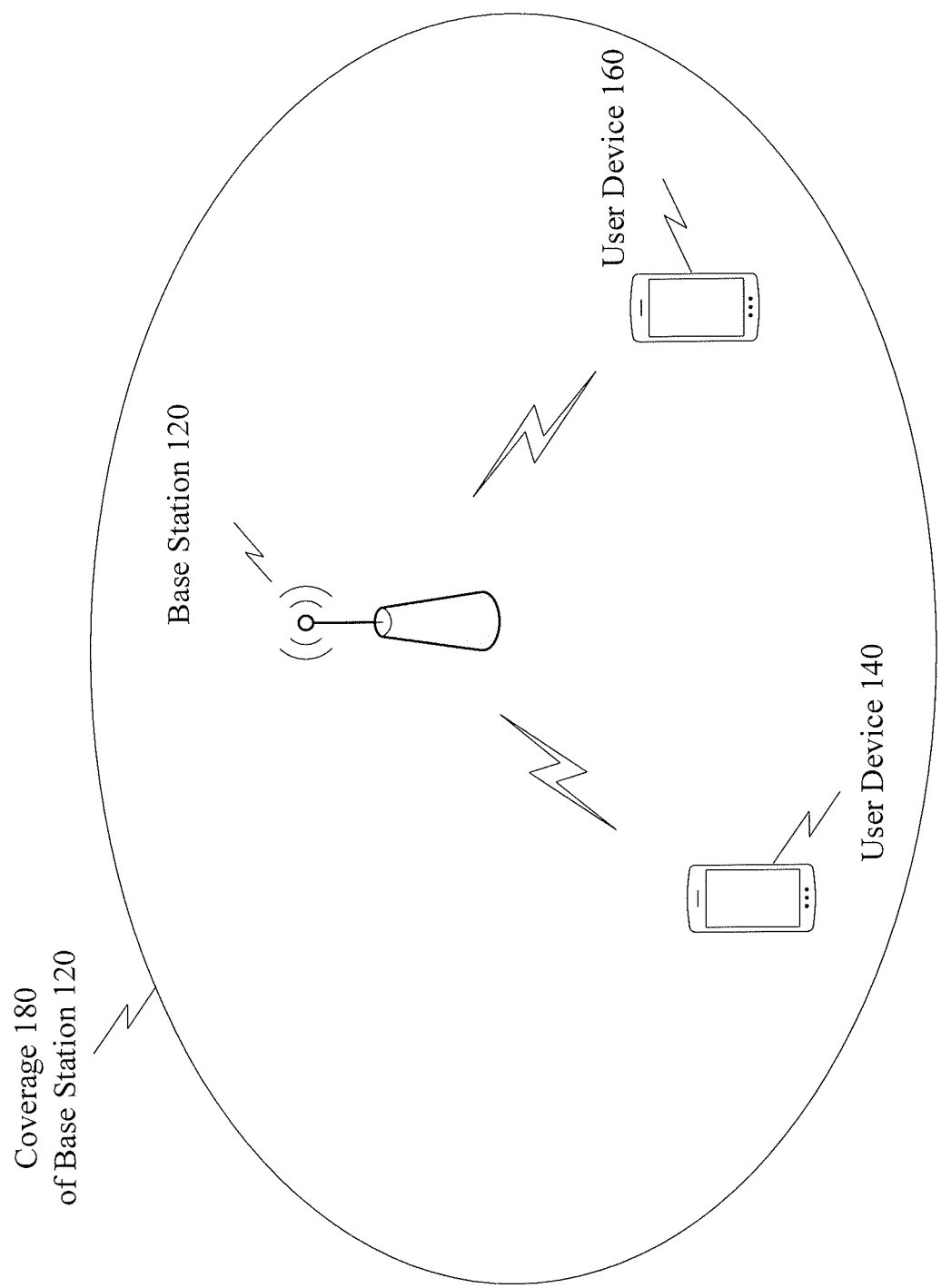
FIG. 1 illustrates an exemplary scenario of a wireless communication system, according to some embodiments of the present application.

FIG. 1 illustrates an exemplary scenario of a wireless communication system, consistent with embodiments of the present application. The wireless communication system includes a base station 120, a user device 140, and another user device 160. Base station 120 is an end node of a wireless communication network. For example, base station 120 may be an evolved node B (eNB) in an LTE system or a gNB in a 5G new radio system. Base station 120 transmits radio signals carrying system information of the wireless communication system. A user device within a coverage 180 around base station 120 may receive the system information. For example, user device 140 within coverage 180 may receive the system information, and access network services through base station 120.

User devices 140 and 160 are mobile terminals in the wireless communication network. For example, user devices 140 and 160 can be a smart phone, a network interface card, or a machine type terminal. As another example, user device 140 may be a user equipment (UE) in the LTE system or the 5G new radio system. Both user device 140 and base station 120 contain communication units that can transmit and receive radio signals.

When user device 140 intends to access network services through base station 120, user device 140 may need to receive control signals from base station 120 to collect system information with coverage 180, such as synchronization and radio resource allocation and schedule. For example, user device 140 in the 5G new radio system may need to receive a PDCCH to learn whether any data in a physical downlink shared channel is transmitted to user device 140. Accordingly, user device 140 needs to detect a PDCCH among signals transmitted by base station 120.

Figure 2:
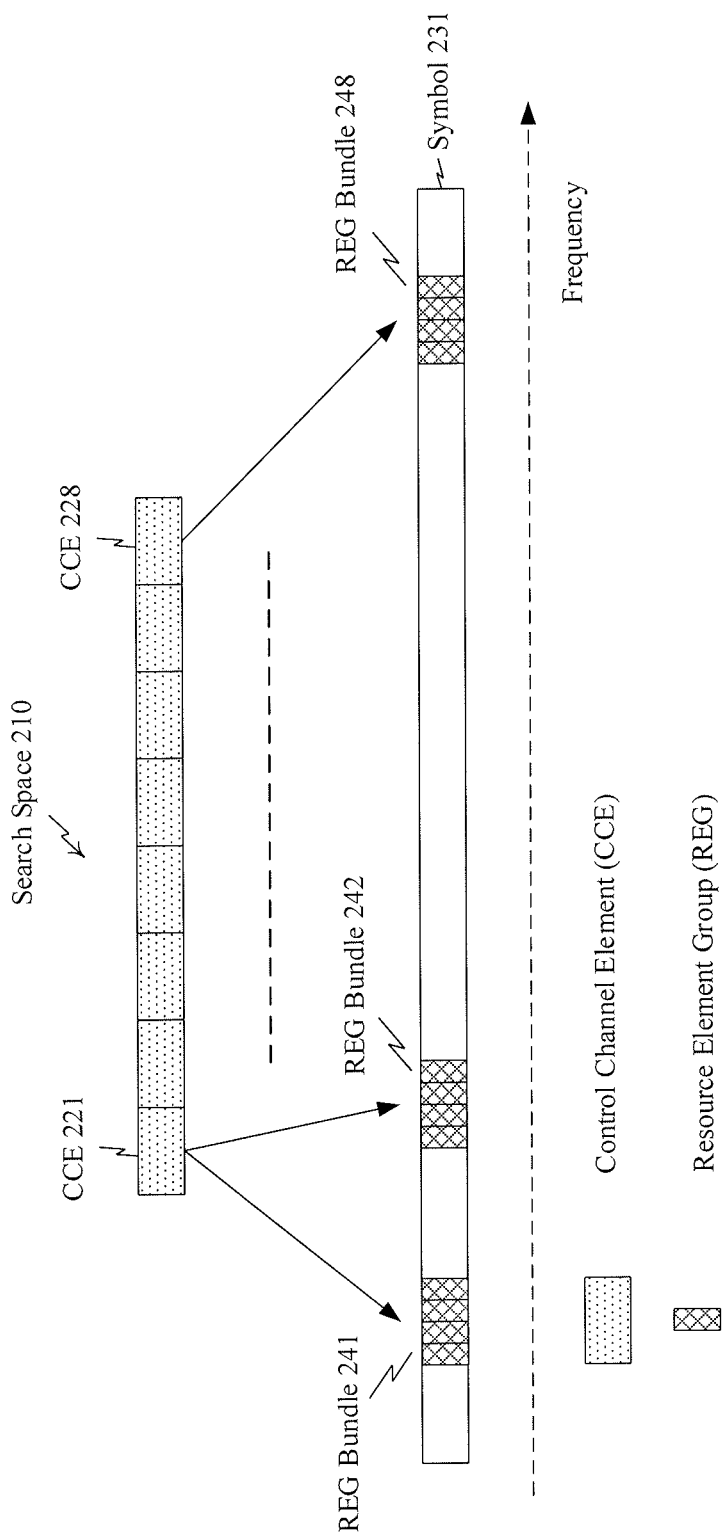
FIG. 2 is a schematic diagram of an exemplary method for control resource bundling in a wireless communication system, according to some embodiments of the present application.

FIG. 2 is a schematic diagram of an exemplary method for control resource bundling in a wireless communication system, according to some embodiments of the present application. A 5G new radio system, for example, uses OFDM waveform for the wireless communications. As in existing LTE cellular networks, communications are measured in time frames, each frame is divided into slots, and each slot may contain multiple OFDM symbols each spanning over the multiple frequency subcarriers. Resources are defined in time (OFDM symbols) and frequency (subcarriers).

A PDCCH search space is a set of resources that a user device, e.g., 140, may assume carry PDCCH candidates and attempt to search and decode to obtain control information. As shown in FIG. 2, base station 120 transmits a PDCCH to user device 140 on a set of CCEs 221-228. User device 140 may assume CCEs 221-228, carrying its PDCCH candidates, is a search space 210, and attempt to search and decode CCEs 221-228 to obtain control information.

Without loss of generality, for a user device, such as user device 140, the instances of resources where PDCCHs are configured to be transmitted (or the instances that the user device is configured to monitor its PDCCH) are called scheduling (or PDCCH) instances hereinafter. User device 140 may conduct blind decoding of all the PDCCH instances in its search space until it successfully decodes its PDCCH candidate. Once its PDCCH is successfully decoded, user device 140 proceeds to receive and decode data transmitted from the base station on a data channel such as a physical downlink shared channel (PDSCH). If user device 140 fails to decode a PDCCH in its search space, user device 140 may assume no PDCCH is transmitted at that scheduling instance and not decode its PDSCH.

PDCCHs can be transmitted in a flexible manner, with control resource sets (CORESETs) configured at a symbol level, a slot level, or a multi-slot level. Consistent with embodiments of the present disclosure, a CORESET may be defined as the user device 140's PDCCH search space and may be user-device specific, and differ from user device to user device. For example, as shown in FIG. 2, base station 120 may use symbol 231 to transmit a PDCCH to user device 140, where base station 120 configures a PDCCH CORESET on symbol 231 for user device 140.

As shown in FIG. 2, search space 210 includes CCEs 221-228, and each CCE includes eight REGs. In other words, base station 120 needs to map REGs of CCEs 221-228 to physical REG bundles 241-248 on symbol 231. In the 5G new radio, base station 120 may need to transmit DMRS in PDCCH to facilitate channel estimation. To increase time and frequency diversity and/or alleviate channel estimation loss, base station 120 may use a bundle of REGs as a unit for mapping REGs of CCEs 221-228 to those physical REGs on symbol 231. Base station 120 transmits DMRS within a bundle of REGs to alleviate potential channel estimation loss. Meanwhile, base station 120 maps bundles of REGs of CCEs 221-228 distributed across the time and/or frequency domains of a CORESET to increase time and/or frequency diversity.

Accordingly, as shown in FIG. 2, base station 120 selects a bundle size of 4 REGs. According to the selected bundle size of 4 REGs, base station 120 bundles eight REGs of CCE 221 into two REG bundles. Base station 120 may separately map these two REG bundles of CCE 221 to REG bundles 241 and 242 on symbol 231. Moreover, base station may transmit a PDCCH to user device 140 on REG bundles 241 and 242.

User device 140 obtains the bundle size used by base station 120 from system information or specific configuration information for user device 140. For example, user device 140 may obtain the bundle size of 4 REGs from a system broadcast channel (BCH). As another example, user device 140 may obtain the bundle size of 4 REGs from configuration of the CORESET.

As noted above, user device 140 may know the configuration of search space 210. Accordingly, user device 140 detects its PDCCH in search space 210 according to the bundle size of 4 REGs. For example, as shown in FIG. 2, user device 140 detects its PDCCH on REG bundles 241 and 242 on symbol 231. If user device 140 detects its PDCCH on bundles 241 and 242, user device 140 may decode the PDCCH on detected REG bundles 241 and 242 to obtain control configuration and relevant parameters.

In some embodiments, base station 120 maps REG bundles of CCEs to REG bundles on OFDM symbols in a distributed manner. For example, as shown in FIG. 2, base station 120 maps the two REG bundles of CCE 221 to separate REG bundles 241 and 242 on symbol 231. This may help increase frequency diversity for PDCCH transmission. User device 140 may know the mapping of REG bundles on symbol 231 in its CORESET, and detect and decode its PDCCH accordingly.

Alternatively, base station 120 may map REG bundles of CCEs to REG bundles on symbols in a contiguous manner. For example, base station 120 may map the two REG bundles of CCE 221 to two contiguous REG bundles (not shown) on symbol 231. This may help improve channel estimation for PDCCH detection by combining DMRS on the two contiguous REG bundles. User device 140 may know the mapping of REG bundles on symbol 231 in its CORESET, and detect and decode its PDCCH accordingly.

Base station 120 can also map REG bundles of CCEs to REG bundles on symbols in a combination of a distributed and a contiguous manners. For example, if base station 120 selects a bundle size of 2 REGs, base station 120 may bundle the eight REGs of CCE 221 into four REG bundles. In such case, base station 120 maps the first two REG bundles of CCE 221 to two contiguous REG bundles (not shown) on symbol 231, and maps the latter two REG bundles of CCE 221 to another two contiguous REG bundles (not shown) on symbol 231. Thus, base station 120 maps the former two contiguous REG bundles and the latter two contiguous REG bundles separately on symbol 231. User device 140 may know the mapping of REG bundles on symbol 231 in its CORESET, and detect and decode its PDCCH accordingly.

Figure 3:
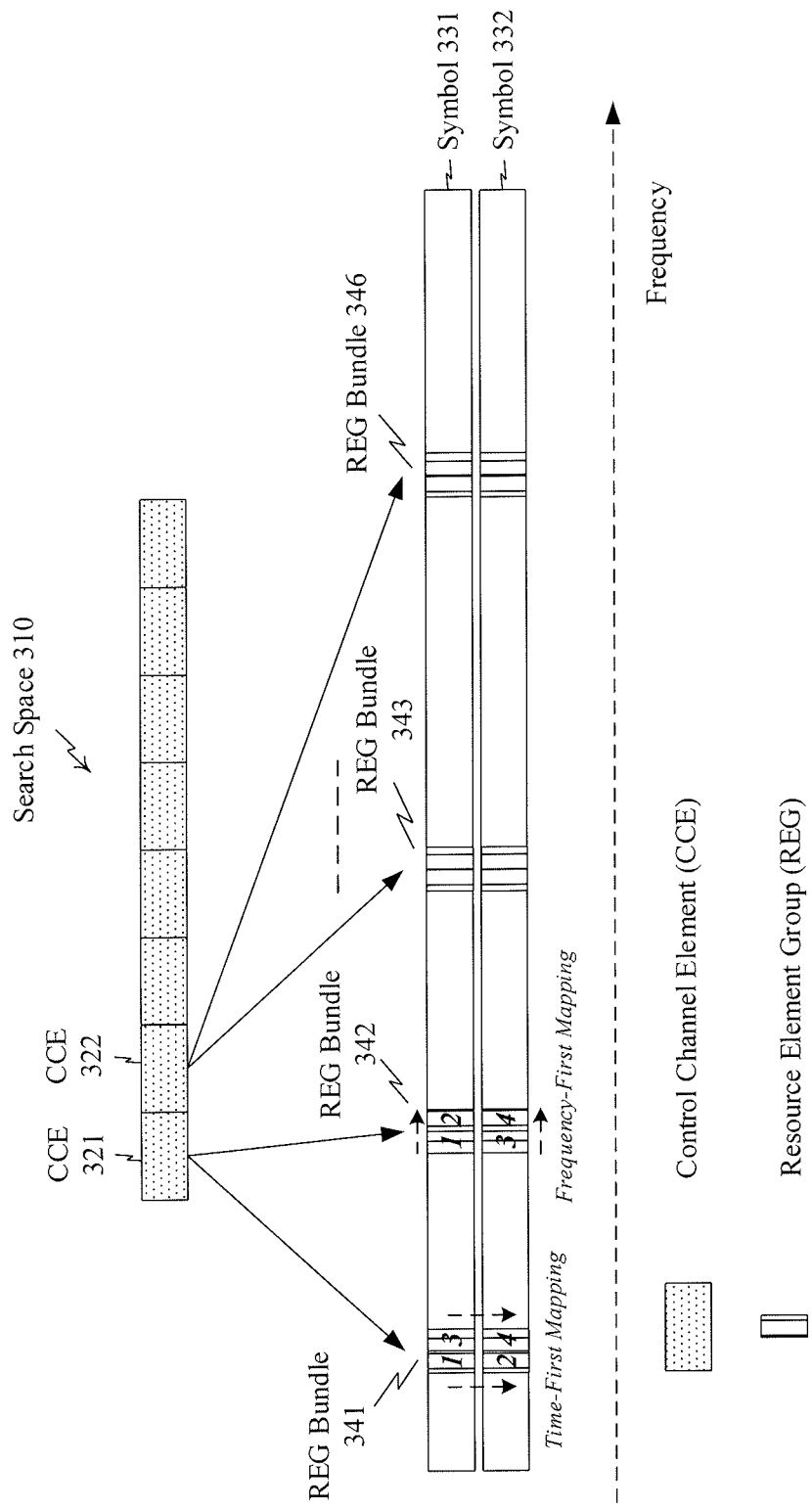
FIG. 3 is a schematic diagram of an exemplary mapping method for control resource bundling in a wireless communication system, according to some embodiments of the present application.

FIG. 3 is a schematic diagram of an exemplary mapping method for control resource bundling in a wireless communication system, according to some embodiments of the present application. Base station 120 may configure a CORESET including more than one symbol. For example, as shown in FIG. 3, the CORESET includes two symbols 331 and 332. Base station 120 can bundle REGs across symbols and/or frequency accordingly.

Base station 120 can form REG bundles of CCEs by arranging REGs within REG bundles in a time-first manner. For example, as shown in FIG. 3, base station 120 selects a bundle size of 4 REGs. Base station 120 forms a REG bundle of CCE 321 and maps to REG bundle 341 on symbols 331 and 332. Base station 120 sequentially maps the REGs of CCE 321 to REGs 1, 2, 3, 4 of REG bundle 341 as shown in FIG. 3. That is, base station 120 maps REGs of CCEs to physical REGs on symbols across symbols first, i.e. a time-first manner. User device 140 may know the mapping of REG bundles on symbols 331 and 332 in its CORESET, and detect and decode its PDCCH accordingly.

Alternatively, base station 120 can form REG bundles of CCEs by arranging REGs within REG bundles in a frequency-first manner. For example, as shown in FIG. 3, base station 120 selects a bundle size of 4 REGs. Base station 120 forms a REG bundle of CCE 321 and maps to REG bundle 342 on symbols 331 and 332. Base station 120 sequentially maps the REGs of CCE 321 to REGs 1, 2, 3, 4 of REG bundle 342 as shown in the figure. That is, base station 120 maps REGs of CCEs to physical REGs on symbols across the frequency domain first, i.e., a frequency-first manner. User device 140 may know the mapping of REG bundles on symbols 331 and 332 in its CORESET, and detect and decode its PDCCH accordingly.

Alternatively, base station 120 can form REG bundles of CCEs by arranging REGs within REG bundles in a combination of a time-first and a frequency-first manners. For example, as shown in FIG. 3, base station 120 selects a bundle size of 4 REGs. Base station 120 forms the first REG bundle of CCE 321 and map to REG bundle 341 on symbols 331 and 332 in the time-first manner as described above. Base station 120 further forms the second REG bundle of CCE 321 and maps to REG bundle 342 on symbols 331 and 332 in a frequency-first manner as described above. That is, base station 120 maps two REG bundles of CCEs to REG bundles on symbols in a combination of the time-first and the frequency-first manners. User device 140 may know the mapping of REG bundles on symbols 331 and 332 in its CORESET, and detect and decode its PDCCH accordingly.

In some embodiments, a CORESET may include one type of CCE-to-REG mapping, such as the time-first or the frequency-first mapping as illustrated above. In some embodiments, a CORESET may include both the time-first and the frequency-first mapping. In some embodiments, both the time-first and the frequency-first mapping may be utilized in a combination as illustrated above.

Table 1 shows examples of REG bundle sizes when a search space includes two or four OFDM symbols. To map the bundled REGs to physical resources on OFDM symbols in a regular manner, a CCE size may be the same as the REG bundle size in terms of REGs, or may be a multiple of the REG bundle size, e.g., twice or three times.

TABLE 1

Examples of REG bundle sizes.

| | CCE Size (number of REGs) | | | |
|---|---|---|---|---|
| | 4 | 6 | 8 | 16 |
| REG Bundle Size (assuming 2 symbols in the search space) | 2 PRBs × 2 symbols | 3 PRBs × 2 symbol | 2 PRBs × 2 symbols 4 PRBs × 2 symbols | 2 PRBs × 2 symbols 4 PRBs × 2 symbols 8 PRBs × 2 symbols |
| REG Bundle Size (assuming 4 symbols in the search space) | | | 2 PRBs × 4 symbols 4 PRBs × 2 symbols | 2 PRBs × 4 symbols 4 PRBs × 4 symbols |

Base station 120 may apply the same precoding vector to REGs in the same REG bundles, and not bundle REGs across CCEs. Moreover, base station 120 may map the bundled REGs to physical resources on OFDM symbols in a regular pattern, e.g., a square or rectangular shape of time-frequency block. This may help to ease implementation of the REG bundling and avoid a waste of fragmented physical resources.

According to the above design considerations and criteria, and providing that a CCE contains even numbers of REGs (e.g., 4, 6, 8 or 16 REGs), base station 120 can also configure only even numbers of OFDM symbols as a search space. For example, base station 120 may configure 2 symbols as a search space for user device 160, regardless an overall number of symbols included in the CORESET.

Figure 4:
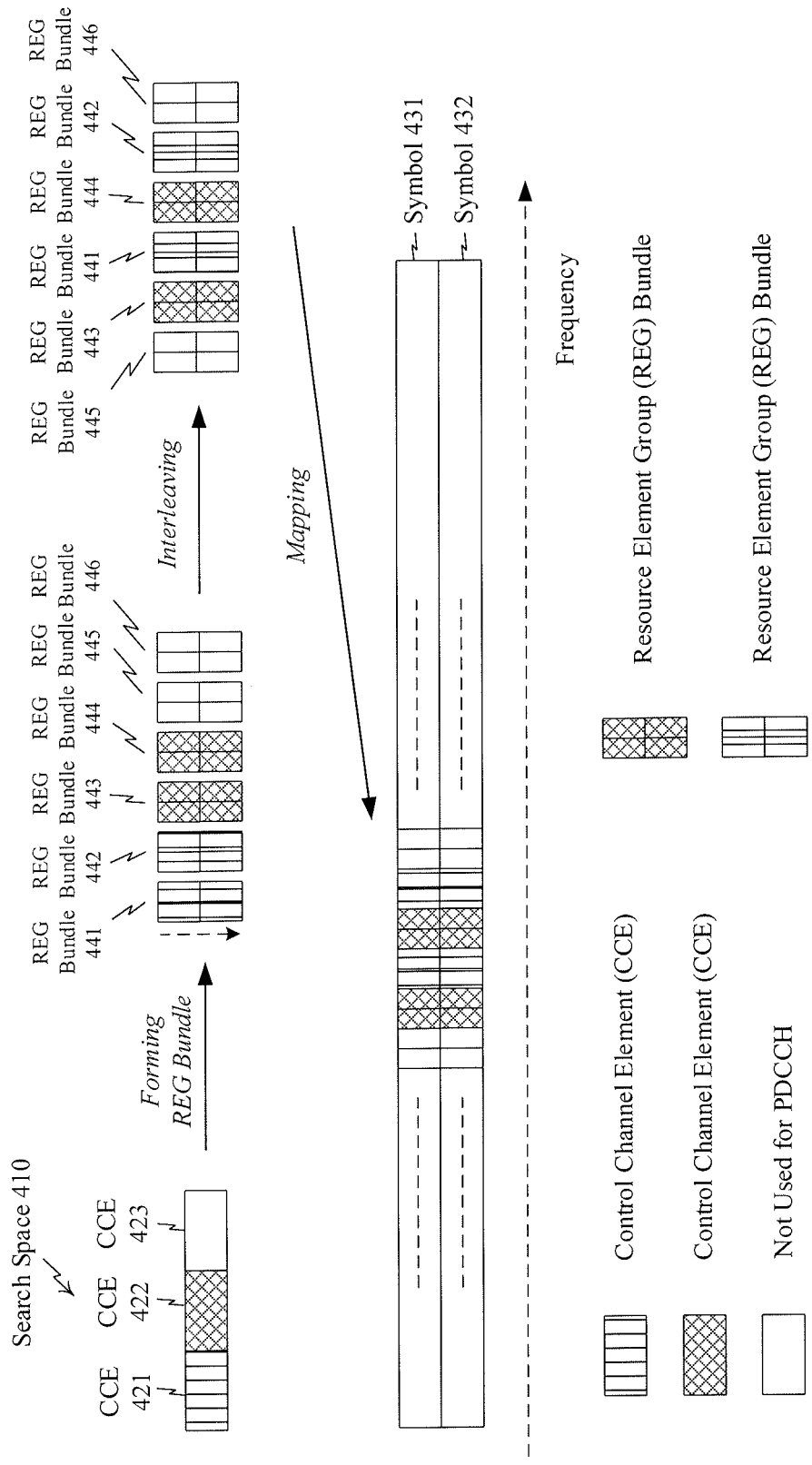
FIG. 4 is a schematic diagram of an exemplary mapping method for control resource bundling in a wireless communication system, according to some embodiments of the present application.

FIG. 4 is a schematic diagram of an exemplary mapping method for control resource bundling in a wireless communication system, according to some embodiments of the present application. Base station 120 may configure a CORESET including more than one symbols. For example, as shown in FIG. 4, the CORESET includes two symbols 431 and 432. Base station 120 configures a search space 410 including three CCEs 421, 422 and 423 for user devices, e.g., user device 140. In the present example, each CCE includes eight REGs.

Base station 120 respectively bundles REGs of CCEs in the CORESET into physical REG bundles on symbols 431 and 432. For example, as shown in FIG. 4, base station 120 selects a bundle size of 4 REGs. More particularly, base station 120 forms two REG bundles 441 and 442 for CCE 421 in the time-first manner as described above. Base station 120 also forms two REG bundles 443 and 444 for CCE 422 in the time-first manner. Moreover, base station 120 does not use CCE 423 for PDCCH transmission. Nonetheless, base station 120 may also form two REG bundles 445 and 446 for CCE 423.

Base station 120 may further interleave the formed REG bundles of CCEs in the CORESET. For example, as shown in FIG. 4, base station 120 interleaves sequential REG bundles 441, 442, 443, 444, 445, and 446 into sequential REG bundles 445, 443, 441, 444, 442, and 446.

After interleaving, base station 120 may map the REG bundles to physical resource elements. For example, as shown in FIG. 4, base station 120 maps the interleaved REG bundles 445, 443, 441, 444, 442, and 446 to those REG bundles on symbols 431 and 432 in a contiguous manner. User device 140 may know the mapping of REG bundles on symbols 431 and 432 in its CORESET, and detect and decode its PDCCH accordingly.

Figure 5:
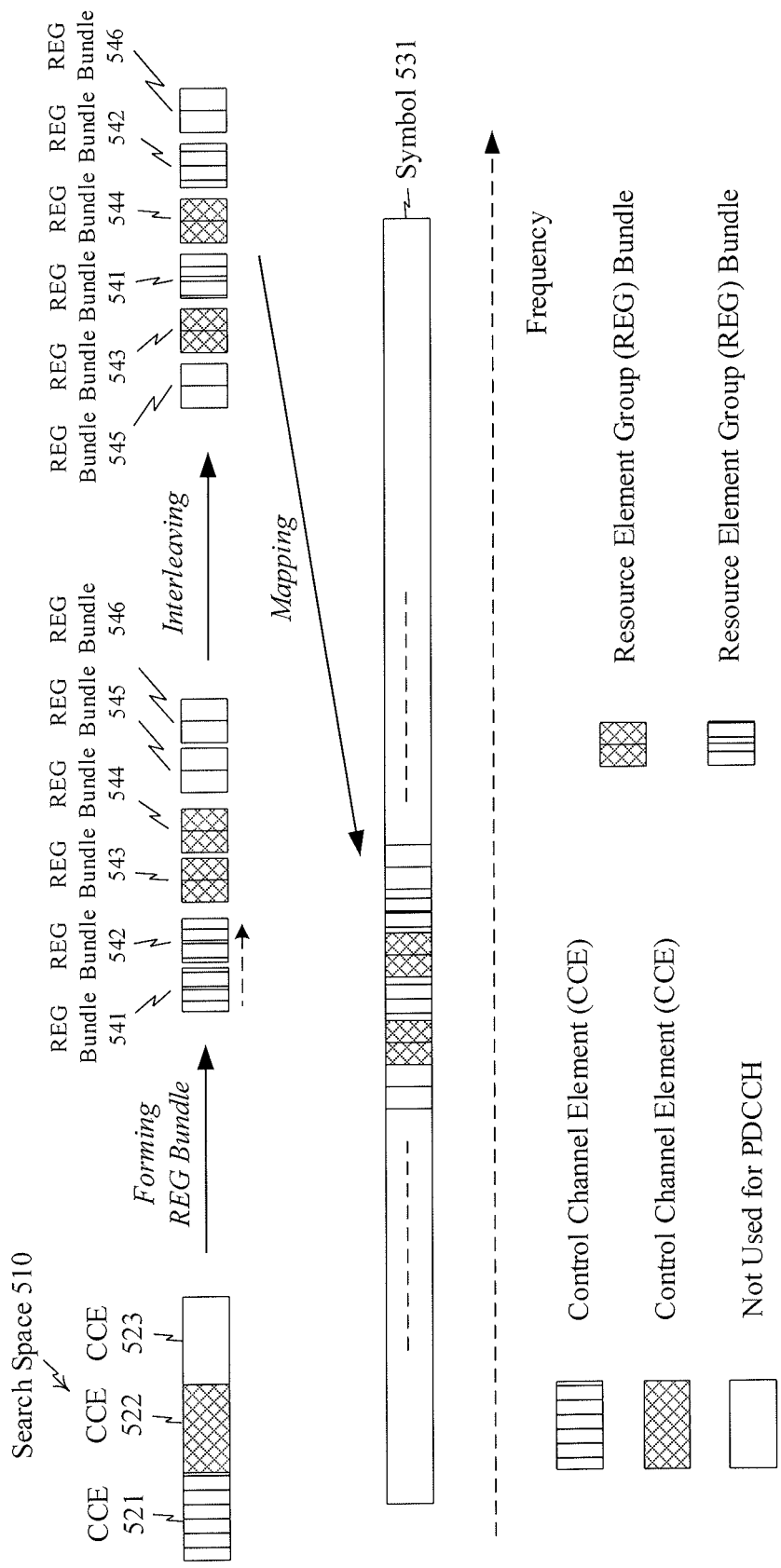
FIG. 5 is a schematic diagram of an exemplary control channel element to resource element group (CCE-to-REG) mapping method for control resource bundling in a wireless communication system, according to some embodiments of the present application.

FIG. 5 is a schematic diagram of an exemplary control channel element to resource element group (CCE-to-REG) mapping method for control resource bundling in a wireless communication system, according to some embodiments of the present application. Base station 120 may configure a CORESET including a symbol. For example, as shown in FIG. 5, the CORESET includes symbol 531. Base station 120 configures a search space 510 including three CCEs 521, 522 and 523 for user devices, e.g., user device 140. In the present example, each CCE includes four REGs.

Base station 120 respectively bundles REGs of CCEs in the CORESET into physical REG bundles on symbol 531. For example, as shown in FIG. 5, base station 120 selects a bundle size of 2 REGs. More particularly, base station 120 forms two REG bundles 541 and 542 for CCE 521 in the frequency-first manner as described above. Base station 120 also forms two REG bundles 543 and 544 for CCE 522 in the frequency-first manner. Moreover, base station 120 does not use CCE 523 for PDCCH transmission. Nonetheless, base station 120 may also form two REG bundles 545 and 546 for CCE 523.

Base station 120 may further interleave the formed REG bundles of CCEs in the CORESET. For example, as shown in FIG. 5, base station 120 interleaves sequential REG bundles 541, 542, 543, 544, 545, and 546 into sequential REG bundles 545, 543, 541, 544, 542, and 546.

After interleaving, base station 120 may map the REG bundles to physical resource elements. For example, as shown in FIG. 5, base station 120 maps the interleaved REG bundles 545, 543, 541, 544, 542, and 546 to those REG bundles on symbol 531 in a contiguous manner. User device 140 may know the mapping of REG bundles on symbol 531 in its CORESET, and detect and decode its PDCCH accordingly.

As noted above, base station 120 can also interleave REG bundles of CCEs with REGs bundles that are not used for PDCCH in the CORESET. For example, in FIG. 4, base station 120 can interleave sequential REG bundles 441, 442, 443, and 444, and unused REG bundles 445 and 446 into sequential REG bundles 445, 443, 441, 444, 442, and 446. REG bundles 445 and 446 are not used for PDCCH transmission in the CORESET in the example.

After interleaving, base station 120 may map the interleaved REG bundles in the CORESET to physical resource elements. For example, as shown in FIG. 4, base station 120 may map the interleaved REG bundles 445, 443, 441, 444, 442, and 446 to those REG bundles on symbols 431 and 432 in a contiguous manner. User device 140 may know the mapping of REG bundles on symbols 431 and 432 in its CORESET, and detect and decode its PDCCH accordingly.

Base station 120 does not use REG bundles 445 and 446 for PDCCH transmission if no PDCCH fits in REG bundles 445 and 446. Alternatively, base station 120 can configure these REG bundles for PDSCH transmission to improve the spectrum efficiency and/or avoid waste of radio resources.

Figure 6:
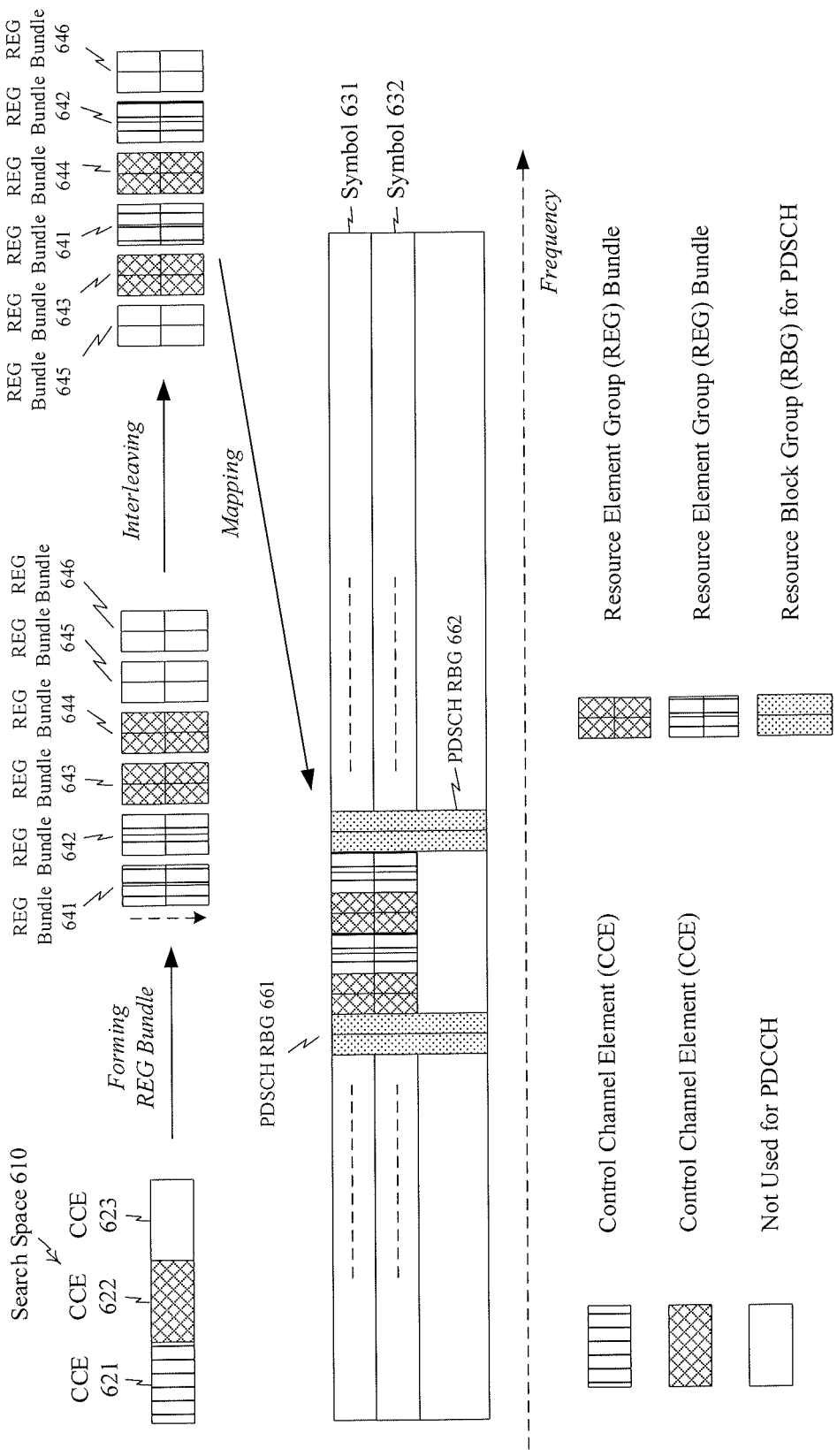
FIG. 6 is a schematic diagram of an exemplary CCE-to-REG mapping method for control resource bundling in a wireless communication system, according to some embodiments of the present application.

FIG. 6 is a schematic diagram of an exemplary CCE-to-REG mapping method for control resource bundling in a wireless communication system, according to some embodiments of the present application. Base station 120 may configure a CORESET including more than one symbol. For example, as shown in FIG. 6, the CORESET includes two symbols 631 and 632. Base station 120 configures a search space 610 including three CCEs 621, 622, and 623 for user devices, e.g., user device 140. In the present example, each CCE includes eight REGs.

Base station 120 respectively bundles REGs of CCEs in the CORESET into physical REG bundles on symbols 631 and 632. For example, as shown in FIG. 6, base station 120 selects a bundle size of 4 REGs. Base station 120 forms two REG bundles 641 and 642 for CCE 621 in the time-first manner, as described above. Base station 120 also forms two REG bundles 643 and 644 for CCE 622 in the time-first manner. Moreover, base station 120 forms two REG bundles 645 and 646 for unused CCE 623.

Base station 120 may further interleave the formed REG bundles of CCEs in the CORESET. For example, as shown in FIG. 6, base station 120 interleaves sequential REG bundles 641, 642, 643, and 644, and unused REG bundles 645 and 646 into sequential REG bundles 645, 643, 641, 644, 642, and 646. REG bundles 645 and 646 are included in the CORESET, but not used for PDCCH transmission.

After interleaving, base station 120 maps the interleaved REG bundles in the CORESET to physical resource elements. For example, as shown in FIG. 6, base station 120 maps the interleaved unused REG bundle 645, REG bundles 643, 641, 644, 642, and unused REG bundle 646 to those REG bundles on symbols 631 and 632 in a contiguous manner. User device 140 may know the mapping of REG bundles on symbols 631 and 632 in the CORESET, and detect and decode its PDCCH accordingly.

Base station 120 can further configure a PDSCH to be transmitted on the physical REG bundles that are mapped by unused REG bundles. Those physical REG bundles are not used for PDCCH transmission. For example, as shown in FIG. 6, base station 120 configures to transmit a PDSCH on PDSCH RBGs 661 and 662. PDSCH RBGs 661 and 662 may include symbols 631 and 632, and more symbols that can be used for PDSCH transmission.

In some embodiments, base station 120 may transmit a PDCCH through two CCEs. For example, base station 120 may transmit a PDCCH through both CCEs 421 and 422 of FIG. 4 if the PDCCH includes payloads that need sixteen REGs to transmit.

Alternatively, base station 120 may transmit two PDCCHs on two CCEs respectively. For example, base station 120 may respectively transmit two PDCCHs through CCEs 421 and 422 of FIG. 4 if the two PDCCHs include payloads that both can fit in eight REGs.

In some embodiments, base station 120 may select the bundle size according to a channel condition or a number of reference signals. For example, base station 120 may select a bundle size of two REGs when base station 120 assumes that a current channel condition is good and requires only DMRS of two REGs for PDCCH detection and/or decoding. As another example, base station 120 may select a bundle size of eight REGs when base station 120 assumes that a current channel condition is in a deep fade and requires DMRS of eight REGs for PDCCH detection and/or decoding.

Alternatively, base station 120 may select the bundle size according to a payload size of a control channel. For example, base station 120 may select a bundle size of eight REGs when base station 120 needs to transmit a PDCCH with a number of payloads that fits in eight REGs or a multiple of eight REGs. As another example, base station 120 may select a bundle size of two REGs when base station 120 needs to transmit a PDCCH with a number of payloads that fits in two REGs or a multiple of two REGs.

Base station 120 can also select the bundle size according to a combination of a channel condition, a number of reference signals, and/or a payload size of a control channel. For example, base station 120 may select a bundle size of two REGs when base station 120 assumes that a current channel condition is good and requires only DMRS of two REGs for PDCCH detection and/or decoding. Then, base station 120 may further determine that the bundle size of two REGs can be used for transmitting a PDCCH with a number of payloads that fits in two REGs or a multiple of two REGs.

In some embodiments, base station 120 may transmit a configuration of a control resource set. The configuration of the control resource set defines a plurality of parameters including one or more of: a beam number, a starting symbol number of the control resource set, a number of symbols of the control resource set, a size of a control channel element (CCE), a number of CCEs, a size of a resource element group (REG) bundle, a combination of a symbol number and a PRB number for a REG bundle, or any combination thereof. For example, base station 120 may transmit a CORESET configuration. The transmitted CORESET configuration indicates 2 beams, a starting symbol at the second symbol of a time slot, two symbols included in the CORESET, a CCE size of eight REGs, two CCEs included in a search space, a bundle size of four REGs, and/or 2 PRBs×2 symbols.

Base station 120 may further transmit a control channel in a control region according to the configuration of the control resource set. For example, base station 120 may transmit a PDCCH according to the above indicated parameters by the CORESET configuration.

In some embodiments, base station 120 may transmit another CORESET configuration. For example, the transmitted another CORESET configuration indicates 1 beam, a starting symbol at the first symbol of a time slot, one symbol included in the CORESET, a CCE size of two REGs, four CCEs included in a search space, a bundle size of 2 REGs, and/or 2 PRBs×1 symbols.

Base station 120 may transmit the control channel according to the CORESET configuration, the another CORESET configuration, or both. For example, base station 120 may transmit a PDCCH according to the above described parameters by the CORESET configuration and/or the above described parameters by the another CORESET configuration.

Figure 7:
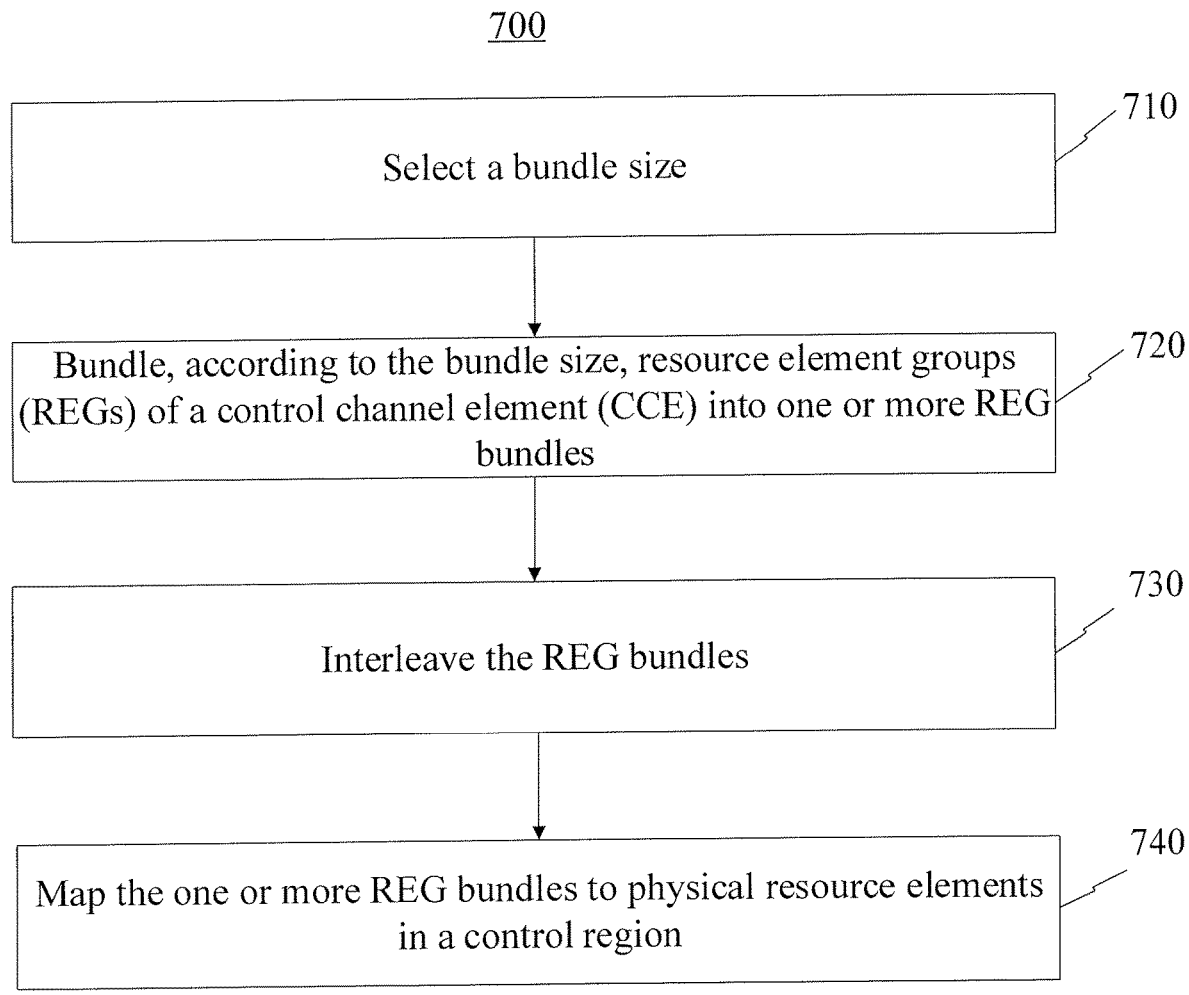
FIG. 7 is a flow diagram of an exemplary CCE-to-REG mapping method for control resource bundling in a wireless communication system, according to some embodiments of the present application.

FIG. 7 is a flow diagram of an exemplary CCE-to-REG mapping method 700 for control resource bundling in a wireless communication system, according to some embodiments of the present application. Method 700 includes selecting a bundle size (step 710), bundling, according to the bundle size, resource element groups (REGs) of a control channel element (CCE) into one or more REG bundles (step 720), interleaving the REG bundles (step 730), and mapping the one or more REG bundles to physical resource elements in a control region (step 740). Method 700 may be practiced by base station 120.

Step 710 includes selecting a bundle size of REGs. For example, as shown in FIG. 2, base station 120 may select a bundle size of 4 REGs. REG bundle 241, 242, and 248 respectively include 4 bundled REGs. Table 1 illustrates examples of REG bundles sizes. As shown in the table, according to CCE sizes, base station 120 may select a REG bundle size to map the bundled REGs to physical resources on OFDM symbols in a regular manner.

For example, base station 120 may select a bundle size so a CCE size is the same as the REG bundle size in terms of REGs, or a multiple of the REG bundle size, e.g., twice or three times. As illustrated in the table, when a CCE size is 8 REGs and 2 symbols are assumed in the search space, base station 120 may select a bundle size of 4 REGs including 2 PRBs×2 symbols, or 8 REGs including 4 PRBs×2 symbols. When a CCE size is 8 REGs and 4 symbols are assumed in the search space, base station 120 selects a bundle size of 8 REGs including 2 PRBs×4 symbols or 4 PRBs×2 symbols.

In some embodiments, when base station 120 select a bundle size of 8 REGs, base station 120 may further select the REG bundle of 2 PRBs×4 symbols or 4 PRBs×2 symbols. When base station 120 selects a bundle size of 16 REGs, base station 120 may further select the REG bundle of 8 PRBs×2 symbols or 4 PRBs×4 symbols.

Step 720 includes bundling, according to the bundle size, resource element groups (REGs) of a control channel element (CCE) into one or more REG bundles. For example, as shown in FIG. 2, according to the selected bundle size of 4 REGs, base station 120 may bundle eight REGs of CCE 221 into two REG bundles. As another example shown in FIG. 5, base station 120 may select a bundle size of 2 REGs. Accordingly, base station 120 may form two REG bundles 541 and 542 each including 2 REGs. Base station 120 may also form two REG bundles 543 and 544 each including 2 REGs according to the selected bundle size.

Step 730 includes interleaving the REG bundles. For example, as shown in FIG. 4, base station 120 may further interleave the formed REG bundles of CCEs in the CORESET. Base station 120 may interleave sequential REG bundles 441, 442, 443, 444, 445, and 446 into sequential REG bundles 445, 443, 441, 444, 442, and 446. As another example shown in FIG. 5, base station 120 may interleave sequential REG bundles 541, 542, 543, 544, 545, and 546 into sequential REG bundles 545, 543, 541, 544, 542, and 546. As another example shown in FIG. 6, base station 120 may interleave sequential REG bundles 641, 642, 643, and 644, and unused REG bundles 645 and 646 into sequential REG bundles 645, 643, 641, 644, 642, and 646. REG bundles 645 and 646 are included in the CORESET, but not used for PDCCH transmission.

Step 740 includes mapping the one or more REG bundles to physical resource elements in a control region. For example, as shown FIG. 2, base station 120 separately maps two REG bundles of CCE 221 to REG bundles 241 and 242 on symbol 231. Base station 120 transmits a PDCCH to user device 140 on REG bundles 241 and 242.

In some embodiments, selecting the bundle size in step 710 may include selecting the bundle size according to a channel condition or a number of reference signals. For example, base station 120 may select a bundle size of two REGs when base station 120 assumes that a current channel condition is good and requires only DMRS of two REGs for PDCCH detection and/or decoding. As another example, base station 120 may select a bundle size of eight REGs when base station 120 assumes that a current channel condition is in a deep fade and requires DMRS of eight REGs for PDCCH detection and/or decoding.

Alternatively, base station 120 may select the bundle size according to a payload size of a control channel. For example, base station 120 may select a bundle size of eight REGs when base station 120 needs to transmit a PDCCH with a number of payloads that fits in eight REGs or a multiple of eight REGs. As another example, base station 120 may select a bundle size of two REGs when base station 120 needs to transmit a PDCCH with a number of payloads that fits in two REGs or a multiple of two REGs.

Base station 120 can also select the bundle size according to a combination of a channel condition, a number of reference signals, and/or a payload size of a control channel. For example, base station 120 may select a bundle size of two REGs when base station 120 assumes that a current channel condition is good and requires only DMRS of two REGs for PDCCH detection and/or decoding. Then, base station 120 may further determine that the bundle size of two REGs can be used for transmitting a PDCCH with a number of payloads that fits in two REGs or a multiple of two REGs.

In some embodiments, bundling the REGs of a first CCE into the one or more first REG bundles in step 720 includes forming each first REG bundle by arranging one or more REGs in a first CCE in a frequency-first manner, a time-first manner, or a combination thereof. Base station 120 can form REG bundles of CCEs by arranging REGs within REG bundles in a frequency-first manner. For example, as shown in FIG. 3, base station 120 can sequentially map the REGs of CCE 321 to REGs 1, 2, 3, 4 of REG bundle 342. That is, base station 120 may map REGs of CCEs to physical REGs on symbols across the frequency domain first, i.e. in a frequency-first manner.

Alternatively, base station 120 can form REG bundles of CCEs by arranging REGs within REG bundles in a time-first manner. For example, as shown in FIG. 3, base station 120 may sequentially map the REGs of CCE 321 to REGs 1, 2, 3, 4 of REG bundle 341. That is, base station 120 may map REGs of CCEs to physical REGs on symbols across symbols first, i.e. in a time-first manner.

Base station 120 can also form REG bundles of CCEs by arranging REGs within REG bundles in a combination of time-first and frequency-first manners. For example, as shown in FIG. 3, base station 120 may form the first REG bundle of CCE 321 and map to REG bundle 341 on symbols 331 and 332 in the time-first manner as described above. Base station 120 may further form the second REG bundle of CCE 321 and map to REG bundle 342 on symbols 331 and 332 in a frequency-first manner as described above. That is, base station 120 may map two REG bundles of CCEs to REG bundles on symbols in a combination of time-first and frequency-first manners.

In some embodiments, mapping the one or more first REG bundles to the physical resource elements in step 740 may include mapping the first REG bundles to the physical resource elements in a contiguous manner, a distributed manner, or a combination thereof. Base station 120 can map REG bundles of CCEs to REG bundles on symbols in a contiguous manner. For example, as shown in FIG. 4, base station 120 may map the interleaved REG bundles 445, 443, 441, 444, 442, and 446 to those REG bundles on symbols 431 and 432 in a contiguous manner. As another example shown in FIG. 5, base station 120 may map the interleaved REG bundles 545, 543, 541, 544, 542, and 546 to those REG bundles on symbol 531 in a contiguous manner.

Alternatively, base station 120 can map REG bundles of CCEs to REG bundles on OFDM symbols in a distributed manner. For example, as shown in FIG. 2, base station 120 may map the two REG bundles of CCE 221 to separate REG bundles 241 and 242 on symbol 231.

Base station 120 can also map REG bundles of CCEs to REG bundles on symbols in a combination of a distributed and a contiguous manners. For example, if base station 120 selects a bundle size of 2 REGs, base station 120 may bundle the eight REGs of CCE 221 into four REG bundles. Base station 120 may map the first two REG bundles of CCE 221 to two contiguous REG bundles (not shown) on symbol 231, and map the latter two REG bundles of CCE 221 to another two contiguous REG bundles (not shown) on symbol 231. Base station 120 may map the former two contiguous REG bundles and the latter two contiguous REG bundles separately on symbol 231.

In some embodiments, method 700 may further include bundling, according to the bundle size, REGs of a second CCE into one or more second REG bundles, and interleaving the first REG bundles and the second REG bundles. Mapping the one or more first REG bundles to the physical resource elements in step 740 may include mapping the first REG bundles and the second REG bundles to the physical resource elements after the interleaving.

For example, as shown in FIG. 4, base station 120 may select a bundle size of 4 REGs. Base station 120 may form two REG bundles 441 and 442 for CCE 421 in the time-first manner as described above. Base station 120 may also form two REG bundles 443 and 444 for CCE 422 in the time-first manner. Base station 120 may interleave sequential REG bundles 441, 442, 443, and 444 into sequential REG bundles 443, 441, 444, and 442. Base station 120 may map the interleaved REG bundles 443, 441, 444, and 442 to those REG bundles on symbols 431 and 432 in a contiguous manner.

In some embodiments, method 700 may further include bundling, according to the bundle size, the REGs of a second CCE into the one or more second REG bundles, and interleaving the first REG bundles, the second REG bundles, and one or more unused REGs. Mapping the one or more first REG bundles to the physical resource elements in step 740 may include mapping the first REG bundles, the second REG bundles, and the one or more unused REGs to the physical resource elements after the interleaving.

For example, as shown in FIG. 5, base station 120 may form two REG bundles 541 and 542 for CCE 521 in the frequency-first manner as described above. Base station 120 may also form two REG bundles 543 and 544 for CCE 522 in the frequency-first manner. Moreover, base station 120 does not use CCE 523 for PDCCH transmission. Nonetheless, base station 120 may also form two REG bundles 545 and 546 for CCE 523. Base station 120 may interleave sequential REG bundles 541, 542, 543, 544, 545, and 546 into sequential REG bundles 545, 543, 541, 544, 542, and 546. After interleaving, base station 120 may map the interleaved REG bundles 545, 543, 541, 544, 542, and 546 to those REG bundles on symbol 531 in a contiguous manner.

In some embodiments, method 700 may further include transmitting a control channel or two different control channels on the first CCE and second CCE. For example, base station 120 may transmit a PDCCH on CCEs 421 and 422 of FIG. 4. As another example, base station 120 may transmit a PDCCH on CCEs 521 and 522 of FIG. 5.

Alternatively, base station 120 may transmit PDCCH #1 on CCE 421, and PDCCH #2 on CCE 422 in FIG. 4. As another example, base station 120 may transmit PDCCH #1 on CCE 521, and PDCCH #2 on CCE 522 in FIG. 5.

In some embodiments, method 700 may further include bundling, according to the bundle size, the REGs of the second CCE into the one or more second REG bundles, and interleaving the first REG bundles, the second REG bundles, and one or more unused REGs. Mapping the one or more first REG bundles to the physical resource elements in step 740 may include mapping the first REG bundles, the second REG bundles, and the one or more unused REGs to the physical resource elements after the interleaving. At least one of the unused REGs is used for user data transmission.

For example, as shown in FIG. 6, base station 120 also forms two REG bundles 643 and 644 for CCE 622 in the time-first manner. Moreover, base station 120 may form two REG bundles 645 and 646 for unused CCE 623. Base station 120 may interleave sequential REG bundles 641, 642, 643, and 644, and unused REG bundles 645 and 646 into sequential REG bundles 645, 643, 641, 644, 642, and 646. REG bundles 645 and 646 are included in the CORESET, but not used for PDCCH transmission. After interleaving, base station 120 may map the interleaved unused REG bundle 645, REG bundles 643, 641, 644, 642, and unused REG bundle 646 to those REG bundles on symbols 631 and 632 in a contiguous manner. Base station 120 may transmit a PDSCH on PDSCH RBGs 661 and 662. PDSCH RBGs 661 and 662 may include symbols 631 and 632, and more symbols that can be used for PDSCH transmission.

In another aspect, another method for control resource bundling in a wireless communication system can include transmitting a configuration of a control resource set. The configuration of the control resource set indicates a plurality of parameters including: a beam number, a starting symbol number of the control resource set, a number of symbols of the control resource set, a size of a control channel element (CCE), a number of CCEs, a size of a resource element group (REG) bundle, a combination of a symbol number and a REG number for a REG bundle, or any combination thereof. The method can also include transmitting a control channel in a control region according to the configuration of the control resource set.

For example, base station 120 may transmit a CORESET configuration. The transmitted CORESET configuration indicates 2 beams, a starting symbol at the second symbol of a time slot, two symbols included in the CORESET, a CCE size of eight REGs, two CCEs included in a search space, a bundle size of four REGs, and/or 2 PRBs×2 symbols. As another example, base station 120 may transmit the CORESET configuration in FIG. 2, 3, 4, 5, or 6.

Base station 120 may transmit a PDCCH according to the above indicated parameters by the CORESET configuration.

The method can further include transmitting another configuration of another control resource set. Transmitting the control channel in the control region includes transmitting the control channel according to the configuration, the another configuration, or both the configuration and the another configuration.

For example, base station 120 may transmit another CORESET configuration. The transmitted another CORESET configuration indicates one beam, a starting symbol at the first symbol of a time slot, one symbol included in the CORESET, a CCE size of two REGs, four CCEs included in a search space, a bundle size of two REGs, and/or two PRBs×one symbols. As another example, base station 120 may transmit the CORESET configuration in FIG. 2, 3, 4, 5, or 6.

Base station 120 may transmit a PDCCH according to the above described parameters by the CORESET configuration and/or the above indicated parameters by the another CORESET configuration.

Figure 8:
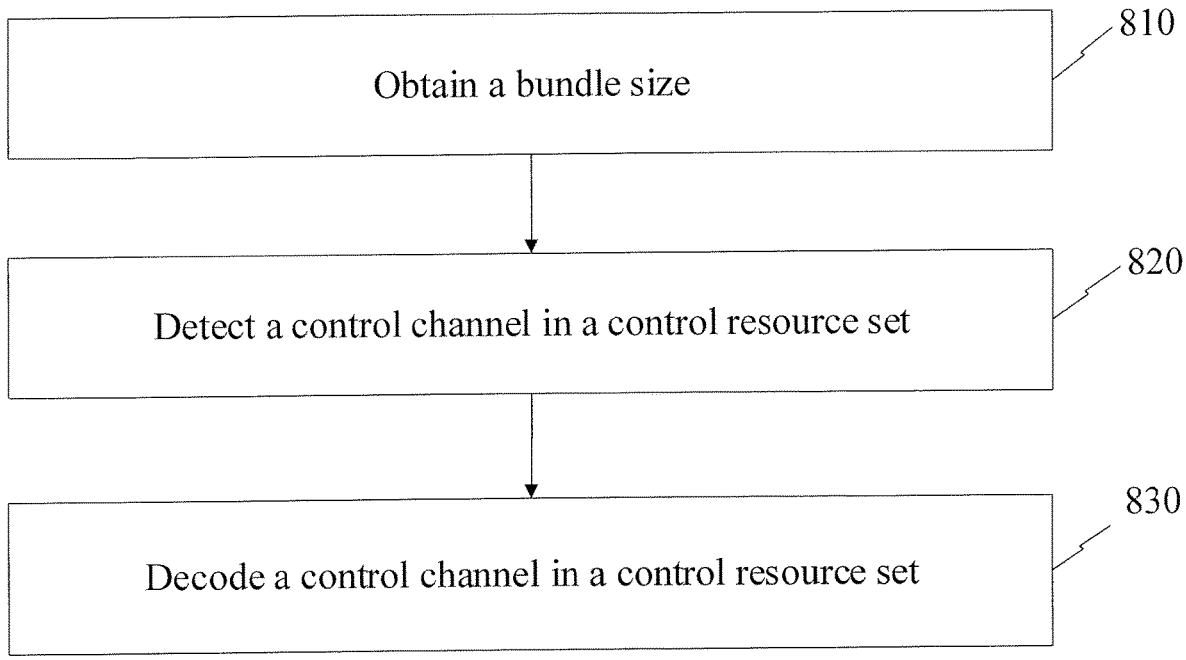
FIG. 8 is a flow diagram of an exemplary method for detecting control resources in a wireless communication system, according to some embodiments of the present application.

FIG. 8 is a flow diagram of an exemplary method 800 for detecting control resources in a wireless communication system, according to some embodiments of the present application. Method 800 includes obtaining a bundle size (step 810), detecting a control channel in a control resource set (step 820), and decoding a control channel in a control resource set (step 830). Method 800 may be practiced by user device 140 or 160.

Step 810 includes obtaining a bundle size. For example, as shown in FIG. 2, user device 140 may obtain the bundle size used by base station 120 from system information or specific configuration information for user device 140. For example, user device 140 may obtain the bundle size of 4 REGs from a system broadcast channel (BCH). As another example, user device 140 may obtain the bundle size of 4 REGs from configuration of the CORESET.

As noted above, base station 120 may select the bundle size according the size of CCEs and available symbols in CORESETs. User device 140 may obtain the bundle size used by base station 120 from system information or specific configuration information for user device 140. For example, base station 120 may use one of the bundle sizes in Table 1. User device 140 may obtain the bundle size used by base station 120 from BCH or an indicator of the bundle size in the physical layer or upper layers.

Step 820 includes detecting a control channel in a control resource set. For example, as shown in FIG. 2, user device 140 can detect its PDCCH on REG bundles 241 and 242 on symbol 231. As another example in FIG. 3, user device 140 can detect its PDCCH on REG bundles 341, 342, 343, . . . , 346 on symbols 331 and 332. For example, user device 140 can detect its PDCCH on REG bundles in FIG. 4, 5, or 6.

Step 830 includes decoding a control channel in a control resource set. For example, as shown in FIG. 2, if user device 140 detects its PDCCH on bundles 241 and 242, user device 140 may decode the PDCCH on detected REG bundles 241 and 242 to obtain control configuration and relevant parameters. As another example, if user device 140 detects its PDCCH on REG bundles in FIG. 3, 4, 5, or 6, user device 140 can decode the PDCCH on detected REG bundles to obtain control configuration and relevant parameters In some embodiments, method 800 may further include receiving a PDSCH on unused REG bundles. For example, as shown in FIG. 6, base station 120 can configure a PDSCH to be transmitted on the physical REG bundles that are mapped by unused REG bundles. Those physical REG bundles are not used for PDCCH transmission. Base station 120 may configure to transmit a PDSCH on PDSCH RBGs 661 and 662. PDSCH RBGs 661 and 662 may include symbols 631 and 632, and more symbols that can be used for PDSCH transmission. According to base station 120's configuration, user device 140 can receive its PDSCH on PDSCH RBGs 661 and 622.

In another aspect, another method for detecting control resources in a wireless communication system can include receiving a configuration of a control resource set. The configuration of the control resource set indicates a plurality of parameters including: a beam number, a starting symbol number of the control resource set, a number of symbols of the control resource set, a size of a control channel element (CCE), a number of CCEs, a size of a resource element group (REG) bundle, a combination of a symbol number and a REG number for a REG bundle, or any combination thereof. The method can also include receiving a control channel in a control region according to the configuration of the control resource set.

For example, base station 120 may transmit a CORESET configuration. The transmitted CORESET configuration indicates 2 beams, a starting symbol at the second symbol of a time slot, two symbols included in the CORESET, a CCE size of eight REGs, two CCEs included in a search space, a bundle size of four REGs, and/or two PRBs×two symbols. Base station 120 may transmit a PDCCH according to the above indicated parameters by the CORESET configuration. User device 140 may receive the CORESET configuration from base station 120. User device 140 may receive its PDCCH according to the CORESET configuration.

The method can further include receiving another configuration of another control resource set. Receiving the control channel in the control region in the method includes receiving the control channel according to the configuration, the another configuration, or both the configuration and the another configuration.

For example, base station 120 may transmit another CORESET configuration. The transmitted another CORESET configuration indicates one beam, a starting symbol at the first symbol of a time slot, one symbol included in the CORESET, a CCE size of two REGs, four CCEs included in a search space, a bundle size of two REGs, and/or two PRBs×one symbol. User device 140 may receive the control channel according to the CORESET configuration, the another CORESET configuration, or both.

Figure 9:
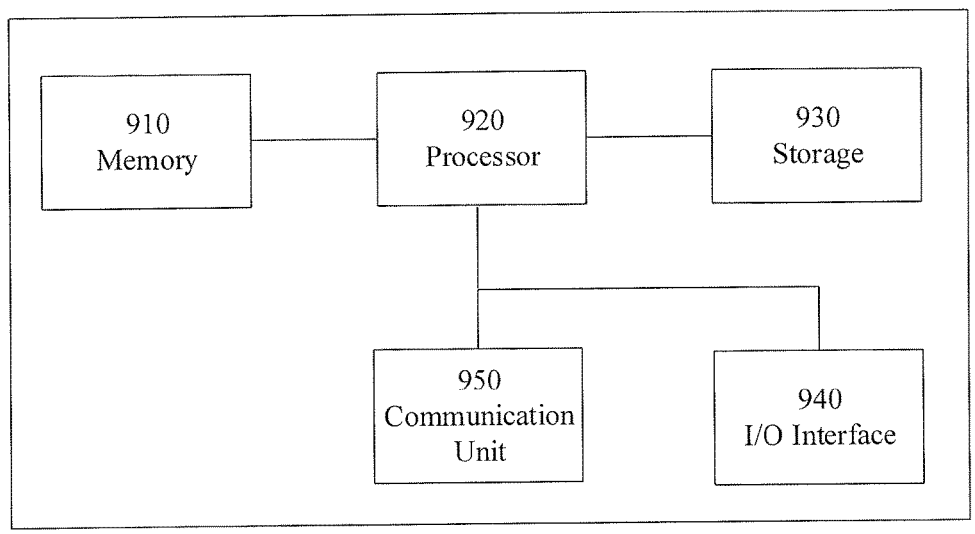
FIG. 9 is a schematic diagram of an exemplary network apparatus for transmitting a control channel in a wireless communication system, according to some embodiments of the present application.

FIG. 9 is a schematic diagram of an exemplary network apparatus 900 for transmitting a control channel in a wireless communication system, according to some embodiments of the present application. Network apparatus 900 includes a memory 910, a processor 920, a storage 930, an I/O interface 940, and a communication unit 950. One or more of these units of network apparatus 900 may be included for configuring and/or transmitting control channels in a wireless communication system. These units may be configured to transfer data and send or receive instructions between or among each other. Base station 120 shown in FIG. 1 may be configured as network apparatus 900. Network apparatus 900 can be a base station, a relay station, a remote radio unit, a network node, or a home base station in a wireless communication system.

Processor 920 includes any appropriate type of general-purpose or special-purpose microprocessor, digital signal processor, or microcontroller. Processor 920 can be one of processors in base station 120. Memory 910 and storage 930 may include any appropriate type of mass storage provided to store any type of information that processor 920 may need to operate. Memory 910 and storage 930 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 910 and/or storage 930 may be configured to store one or more programs for execution by processor 920 to perform exemplary control resource bundling in a wireless communication system, as disclosed herein.

Memory 910 and/or storage 930 may be further configured to store information and data used by processor 920. For instance, memory 910 and/or storage 930 may be configured to store bundle sizes, contiguous and/or distributed manners used in mapping, frequency-first and/or time-first manners used in mapping, system information, CORESET configurations, and CORESETs for user devices.

I/O interface 940 may be configured to facilitate the communication between network apparatus 900 and other apparatuses. For example, I/O interface 940 may receive a signal from another apparatus (e.g., a computer) including system configuration for network apparatus 900. I/O interface 940 may also output data of transmitting statistics to other apparatuses.

Communication unit 950 may include one or more cellular communication modules, including, for example, a 5G new radio system, a Long-Term Evolution (LTE), a High Speed Packet Access (HSPA), a Wideband Code-Division Multiple Access (WCDMA), and/or a Global System for Mobile communication (GSM) communication module.

Processor 920 can be configured to select a bundle size of REGs. For example, as shown in FIG. 2, processor 920 can be configured to select a bundle size of 4 REGs. REG bundle 241, 242, and 248 respectively include 4 bundled REGs. Table 1 illustrates examples of REG bundles sizes. As shown in the table, according to CCE sizes, processor 920 can be configured to select a REG bundle size to map the bundled REGs to physical resources on OFDM symbols in a regular manner.

For example, processor 920 can be configured to select a bundle size for a CCE size to be the same as the REG bundle size in terms of REGs, or may be a multiple of the REG bundle size, e.g., twice or three times. As illustrated in the table, when a CCE size is eight REGs and two symbols are assumed in the search space, processor 920 can be configured to select a bundle size of four REGs including two PRBs×two symbols, or eight REGs including four PRBs×two symbols. When a CCE size is eight REGs and four symbols are assumed in the search space, processor 920 can be configured to select a bundle size of eight REGs including two PRBs×four symbols or four PRBs×two symbols.

In some embodiments, when processor 920 is configured to select a bundle size of eight REGs, processor 920 can be further configured to select the REG bundle of two PRBs×four symbols or four PRBs×two symbols. When processor 920 is configured to select a bundle size of sixteen REGs, processor 920 can be further configured to select the REG bundle of eight PRBs×two symbols or four PRBs×four symbols.

Processor 920 can also be configured to bundle, according to the bundle size, resource element groups (REGs) of a control channel element (CCE) into one or more REG bundles. For example, as shown in FIG. 2, according to the selected bundle size of four REGs, processor 920 can be configured to bundle eight REGs of CCE 221 into two REG bundles. As another example shown in FIG. 5, processor 920 can be configured to select a bundle size of two REGs. Accordingly, processor 920 can be configured to form two REG bundles 541 and 542 each including two REGs. Processor 920 can also be configured to form two REG bundles 543 and 544 each including two REGs accordingly the selected bundle size.

Processor 920 can further be configured to interleave the REG bundles. For example, as shown in FIG. 4, processor 920 can be configured to interleave the formed REG bundles of CCEs in the CORESET. Processor 920 can be configured to interleave sequential REG bundles 441, 442, 443, 444, 445, and 446 into sequential REG bundles 445, 443, 441, 444, 442, and 446. As another example shown in FIG. 5, processor 920 can be configured to interleave sequential REG bundles 541, 542, 543, 544, 545, and 546 into sequential REG bundles 545, 543, 541, 544, 542, and 546. As another example shown in FIG. 6, processor 920 can be configured to interleave sequential REG bundles 641, 642, 643, and 644, and unused REG bundles 645 and 646 into sequential REG bundles 645, 643, 641, 644, 642, and 646. REG bundles 645 and 646 are included in the CORESET, but not used for PDCCH transmission.

Processor 920 can further be configured to map the one or more REG bundles to physical resource elements in a control region. For example, as shown FIG. 2, processor 920 can be configured to separately map the two REG bundles of CCE 221 to REG bundles 241 and 242 on symbol 231. Base station may transmit a PDCCH to user device 140 on REG bundles 241 and 242.

In some embodiments, processor 920 may also be configured to perform the steps described above for method 700.

In another aspect, processor 920 can be configured to transmit a configuration of a control resource set by communication unit 950. The configuration of the control resource set indicates a plurality of parameters including: a beam number, a starting symbol number of the control resource set, a number of symbols of the control resource set, a size of a control channel element (CCE), a number of CCEs, a size of a resource element group (REG) bundle, a combination of a symbol number and a REG number for a REG bundle, or any combination thereof. Processor 920 can be further configured to control communication unit 950 to transmit a control channel in a control region according to the configuration of the control resource set.

For example, processor 920 can be configured to control communication unit 950 to transmit a CORESET configuration. The transmitted CORESET configuration indicates 2 beams, a starting symbol at the second symbol of a time slot, two symbols included in the CORESET, a CCE size of eight REGs, two CCEs included in a search space, a bundle size of four REGs, and/or two PRBs×two symbols. As another example, processor 920 can be configured to control communication unit 950 to transmit the CORESET configuration in FIG. 2, 3, 4, 5, or 6.

Processor 920 can be configured to control communication unit 950 to transmit a PDCCH according to the above indicated parameters by the CORESET configuration.

Processor 920 can also be configured to control communication unit 950 to transmit another configuration of another control resource set. Processor 920 can be configured to control communication unit 950 to transmit the control channel according to the configuration, the another configuration, or both the configuration and the another configuration.

For example, processor 920 can be configured to control communication 950 to transmit another CORESET configuration. The transmitted another CORESET configuration indicates one beam, a starting symbol at the first symbol of a time slot, one symbol included in the CORESET, a CCE size of two REGs, four CCEs included in a search space, a bundle size of two REGs, and/or two PRBs×one symbols. As another example, processor 920 can be configured to control communication unit 950 to transmit the CORESET configuration in FIG. 2, 3, 4, 5, or 6.

Processor 920 can be configured to control communication unit 950 to transmit a PDCCH according to the above indicated parameters by the CORESET configuration and/or the above indicated parameters by the another CORESET configuration.

Figure 10:
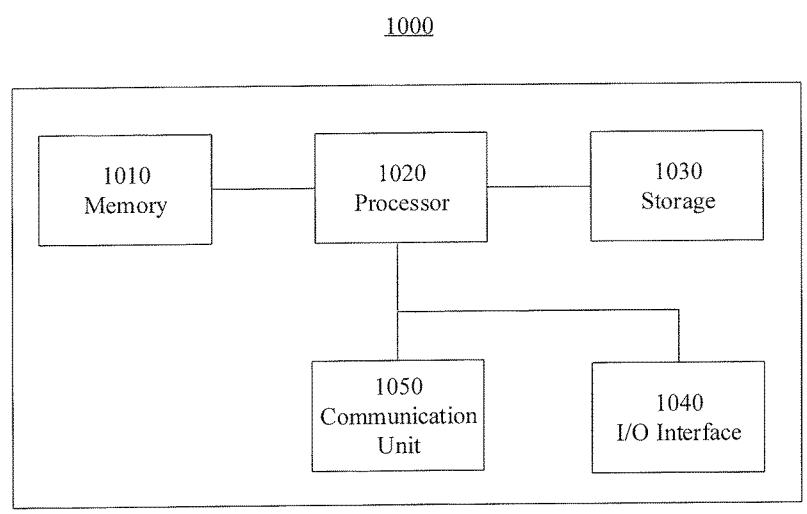
FIG. 10 is a schematic diagram of an exemplary user device for detecting a control channel in a wireless communication system, according to some embodiments of the present application.

FIG. 10 is a schematic diagram of an exemplary user device 1000 for detecting a control channel in a wireless communication system, according to some embodiments of the present application. User device 140 or 160 shown in FIG. 1 may be configured as user device 1000. User device 1000 includes a memory 1010, a processor 1020, a storage 1030, an I/O interface 1040, and a communication unit 1050. One or more of these units of user device 1000 may be included for receiving configuration of channel channels and/or detecting control channels in a wireless communication system. These units may be configured to transfer data and send or receive instructions between or among each other.

Processor 1020 includes any appropriate type of general-purpose or special-purpose microprocessor, digital signal processor, or microcontroller. Memory 1010 and storage 1030 may be configured as described above for memory 910 and storage 930. Memory 1010 and/or storage 1030 may be further configured to store information and data used by processor 1020. For instance, memory 1010 and/or storage 1030 may be configured to store bundle sizes, contiguous and/or distributed manners used in mapping, frequency-first and/or time-first manners used in mapping, system information, CORESET configurations, and CORESETs for user devices.

I/O interface 1040 may be configured to facilitate the communication between user device 1000 and other apparatuses. For example, I/O interface 1040 may receive a signal from another apparatus (e.g., a computer) that system configuration for user device 1000. I/O interface 1040 may also output data of detecting statistics to other apparatuses.

Communication unit 1050 may include one or more cellular communication modules, including, for example, a 5G new radio system, a Long-Term Evolution (LTE), a High Speed Packet Access (HSPA), a Wideband Code-Division Multiple Access (WCDMA), and/or a Global System for Mobile communication (GSM) communication module.

Processor 1020 may be configured to obtain a bundle size. For example, as shown in FIG. 2, processor 1020 may be configured to obtain the bundle size used by base station 120 from system information or specific configuration information for user device 1000. For example, processor 1020 may be configured to obtain the bundle size of four REGs from a system broadcast channel (BCH). As another example, processor 1020 may be configured to obtain the bundle size of four REGs from configuration of the CORESET.

As noted above, base station 120 may select the bundle size according the size of CCEs and available symbols in CORESETs. Processor 1020 may be configured to obtain the bundle size used by base station 120 from system information or specific configuration information for user device 1000. For example, base station 120 may use one of bundle sizes in Table 1. Processor 1020 may be configured to obtain the bundle size used by base station 120 from BCH or an indicator of the bundle size in physical layer or upper layers.

Processor 1020 may also be configured to detect a control channel in a control resource set. For example, as shown in FIG. 2, processor 1020 may be configured to detect PDCCH on REG bundles 241 and 242 on symbol 231. As another example in FIG. 3, processor 1020 may be configured to detect PDCCH on REG bundles 341, 342, 343, . . . , 346 on symbols 331 and 332. For example, processor 1020 may be configured to detect PDCCH on REG bundles in FIG. 4, 5, or 6.

Processor 1020 may further be configured to decode a control channel in a control resource set. For example, as shown in FIG. 2, if processor 1020 is configured to detect its PDCCH on bundles 241 and 242, processor 1020 may further be configured to decode the PDCCH on detected REG bundles 241 and 242 to obtain a control configuration and relevant parameters. As another example, if processor 1020 is configured to detect its PDCCH on REG bundles in FIG. 3, 4, 5, or 6, processor 1020 may be configured to decode the PDCCH on detected REG bundles to obtain a control configuration and relevant parameters In some embodiments, processor 1020 may be configured to receive PDSCH on unused REG bundles. For example, as shown in FIG. 6, base station 120 configures a PDSCH to be transmitted on those physical REG bundles that are mapped by unused REG bundles. Those physical REG bundles are not used for PDCCH transmission. Base station 120 may configure to transmit a PDSCH on PDSCH RBGs 661 and 662. PDSCH RBGs 661 and 662 may include symbols 631 and 632, and more symbols that can be used for PDSCH transmission. According to base station 120's configuration, processor 1020 may be configured to receive its PDSCH on PDSCH RBGs 661 and 622.

In some embodiments, processor 1020 may also be configured to perform the steps described above for method 800.

In another aspect, processor 1020 may be configured to control communication unit 1050 to receive a configuration of a control resource set. The configuration of the control resource set indicates a plurality of parameters including: a beam number, a starting symbol number of the control resource set, a number of symbols of the control resource set, a size of a control channel element (CCE), a number of CCEs, a size of a resource element group (REG) bundle, a combination of a symbol number and a REG number for a REG bundle, or any combination thereof. Processor 1020 can be further configured to control communication unit 1050 to receive a control channel in a control region according to the configuration of the control resource set.

For example, base station 120 may transmit a CORESET configuration. The transmitted CORESET configuration indicates two beams, a starting symbol at the second symbol of a time slot, two symbols included in the CORESET, a CCE size of eight REGs, two CCEs included in a search space, a bundle size of four REGs, and/or two PRBs×two symbols. Base station 120 may transmit a PDCCH according to the above indicated parameters by the CORESET configuration. Processor 1020 may be configured to control communication unit 1050 to receive the CORESET configuration from base station 120. Processor 1020 may be configured to control communication unit 1050 to receive its PDCCH according to the CORESET configuration.

Processor 1020 may be configured to receive another configuration of another control resource set. Receiving the control channel in the control region by processor 1020 includes receiving the control channel according to the configuration, the another configuration, or both the configuration and the another configuration.

For example, base station 120 may transmit another CORESET configuration. The transmitted another CORESET configuration indicates one beam, a starting symbol at the first symbol of a time slot, one symbol included in the CORESET, a CCE size of two REGs, four CCEs included in a search space, a bundle size of two REGs, and/or two PRBs×one symbols. Processor 1020 may be configured to control communication unit 1050 to receive the control channel according to the CORESET configuration, the another CORESET configuration, or both.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be included in the storage device or the memory module that network apparatus 900 and user device 1000 have the instructions stored thereon, as disclosed. In some embodiments, the computer-readable medium may be a disc or a flash drive having the instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

The invention claimed is:

1. A method for control resource bundling in a wireless communication system, comprising:
configuring multiple control resource sets (CORESETs) for a user device;
selecting a bundle size of each CORESET in the multiple CORESETs;
bundling, according to the bundle size of the each CORESET, resource element groups (REGs) of control channel element (CCE) of the each CORESET into one or more REG bundles;
mapping the one or more REG bundles to physical resource elements for control channel transmission; and
transmitting a control channel to the user device according to a bundle size of a CORESET in the multiple CORESETs.

2. The method of claim 1, wherein bundling the REGs of the CCE of the each CORESET into the one or more REG bundles comprises:
forming REG bundle by arranging one or more REGs in the each CCE in a frequency-first manner, a time-first manner, or a combination thereof.

3. The method of claim 1, wherein:
bundle sizes of different CORESETs are different.

4. The method of claim 1, further comprising:
transmitting configurations of the multiple CORESETs, wherein configuration of each CORESET defines a bundle size of REG bundle of the each CORESET and a number of symbols of the each CORESET.

5. The method of claim 1, wherein;
multiple REG bundles in each CCE are interleaved.

6. A method for a wireless communication device, comprising:
obtaining a bundle size of each control resource set (CORESET) in multiple CORESETs, wherein:
resource element groups (REGs) of control channel element (CCE) of the each CORESET are bundled, according to the bundle size of the each CORESET, into one or more REG bundles, and
the one or more REG bundles are mapped to physical resource elements for control channel transmission; and
detecting a control channel in the multiple CORESETs according to the bundle size of the each CORESET.

7. The method of claim 6, wherein:
REG bundle of each CCE is formed by arranging one or more REGs in the each CCE in a frequency-first manner, a time-first manner, or a combination thereof.

8. The method of claim 6, wherein;
multiple REG bundles in each CCE are interleaved.

9. The method of claim 6, wherein:
bundle sizes of different CORESETs are different.

10. The method of claim 6, further comprising:
receiving configurations of the multiple CORESETs, wherein configuration of each CORESET defines a bundle size of REG bundle of the each CORESET and a number of symbols of the each CORESET.

11. A network apparatus for control resource bundling in a wireless communication system, comprising:
a memory storing instructions; and
a processor communicatively coupled to the memory,
wherein the instructions, when executed by the processor, cause the processor to perform operations including:
configuring multiple control resource sets (CORESETs) for a user device;
selecting a bundle size of each CORESET in the multiple CORESETs;
bundling, according to the bundle size of the each CORESET, resource element groups (REGs) of control channel element (CCE) of the each CORESET into one or more REG bundles;
mapping the one or more REG bundles to physical resource elements for control channel transmission; and
transmitting a control channel to the user device according to a bundle size of a CORESET in the multiple CORESETs.

12. The network apparatus of claim 11, wherein bundling the REGs of the CCE of the each CORESET into the one or more REG bundles comprises:
forming REG bundle by arranging one or more REGs in the each CCE in a frequency-first manner, a time-first manner, or a combination thereof.

13. The network apparatus of claim 11, wherein:
bundle sizes of different CORESETs are different.

14. The network apparatus of claim 11, further comprising:
transmitting configurations of the multiple CORESETs, wherein configuration of each CORESET defines a bundle size of REG bundle of the each CORESET and a number of symbols of the each CORESET.

15. The network apparatus of claim 11, wherein;
multiple REG bundles in each CCE are interleaved.

16. A user device, comprising:
a memory storing instructions; and
a processor communicatively coupled to the memory,
wherein the instructions, when executed by the processor, cause the processor to perform operations including:
obtaining a bundle size of each control resource set (CORESET) in multiple CORESETs, wherein:
resource element groups (REGs) of control channel element (CCE) of the each CORESET are bundled, according to the bundle size of the each CORESET, into one or more REG bundles, and
the one or more REG bundles are mapped to physical resource elements for control channel transmission; and
detecting a control channel in the multiple CORESETs according to the bundle size of the each CORESET.

17. The user device of claim 16, wherein:
REG bundle of each CCE is formed by arranging one or more REGs in the each CCE in a frequency-first manner, a time-first manner, or a combination thereof.

18. The user device of claim 16, wherein;
multiple REG bundles in each CCE are interleaved.

19. The user device of claim 16, wherein:
bundle sizes of different CORESETs are different.

20. The user device of claim 16, further comprising:
receiving configurations of the multiple CORESETs, wherein configuration of each CORESET defines a bundle size of REG bundle of the each CORESET and a number of symbols of the each CORESET.

* * * * *